July 29, 1924.
J. A. HARDEL
ACCURATE THREAD CUTTING AND GRINDING MACHINE
Filed April 29, 1920
1,503,320
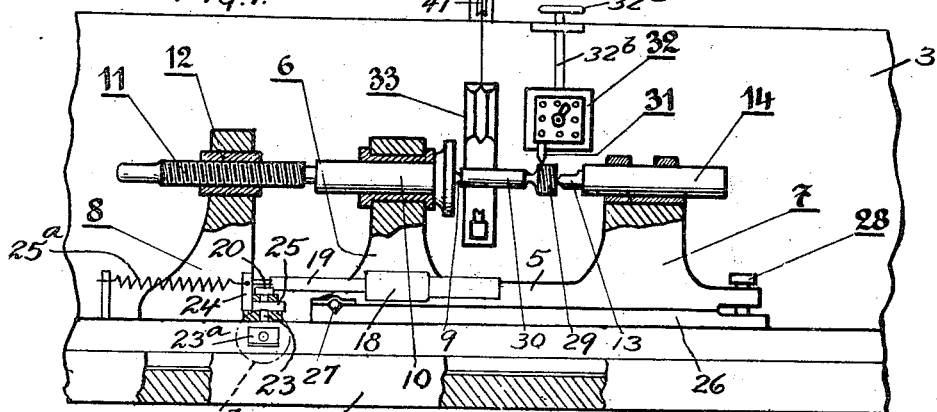
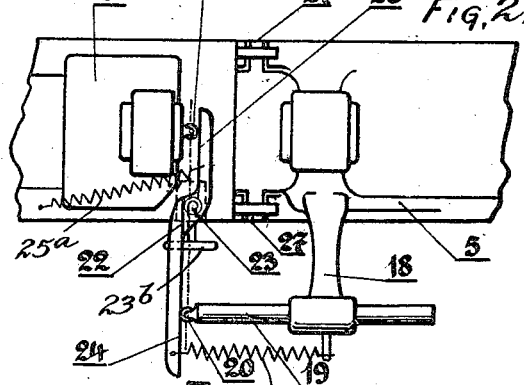
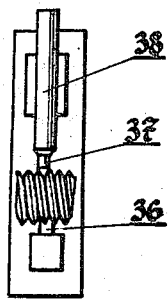
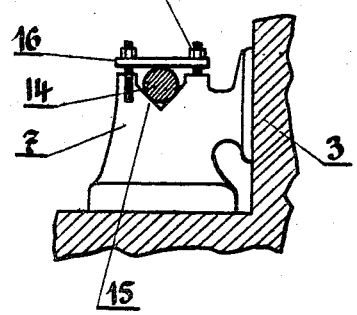
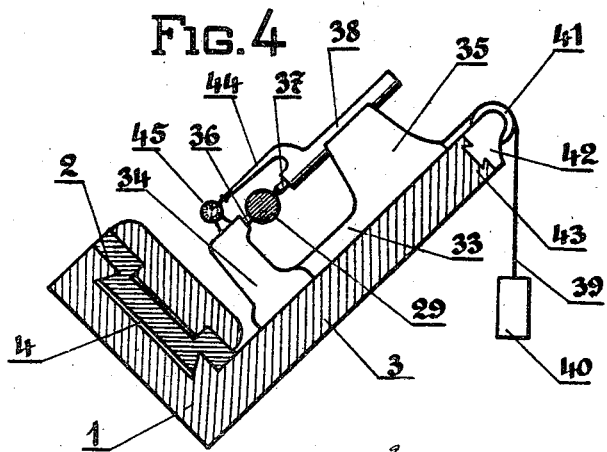
Inventor
Jean Amédée Hardel Patented July 29, 1924.

1,503,320

UNITED STATES PATENT OFFICE.

JEAN AMEDEE HARDEL, OF PARIS, FRANCE.

ACCURATE THREAD CUTTING AND GRINDING MACHINE.

Application filed April 29, 1920. Serial No. 377,700.

*To all whom it may concern:*

Be it known that I, JEAN AMEDEE HARDEL, a citizen of France, and a resident of the city of Paris, France, have invented a new and useful Accurate Thread Cutting and Grinding Machine, of which the following is a specification.

My invention relates to the manufacturing of accurate threaded pieces.

The manufacture of threaded parts of machinery, such as screws, screw-pins, nuts, etc., with true diameter and pitch is very difficult, chiefly for steel parts to be hardened after cutting; in fact, the hardening causes either an increase or a shrinkage of the lead, which has to be standardized thru subsequent operations.

Up to this date, such a standardization is made either by means of a cast iron nut, or with a screw of a pitch slightly larger (or smaller) than the standard, which is covered with emery and screwed on and out of the manufactured part, or by means of a grinding wheel the operation being facilitated in either case by cutting out the initial thread to either a smaller or larger pitch, to compensate the change expected from the hardening.

The cutting of such thread, the pitch of which slightly differs from the pitch of the lead-screw of the lathe is obtained by the action of mechanisms, with the effect that the driven lead-screw has either a lower or a higher speed than the driving pinion. In one of these mechanisms, for instance, the lead-screw is connected to the pinion by a coupling clutch, a part of which is connected to the carriage by a rod and, sliding over the lead-screw with the same velocity as the carriage itself and, is provided with a finger. This finger working in the helical groove of another part of the driving clutch, this connection causes the screw to revolve either with a slight advance on the pinion's motion, or behind it, while the carriage moves up. Therefore the thread cut on the manufactured screw is alterated as desired. But this mechanism is complicated and, moreover a perfect helical groove is not easy to make, so much the more that the pitch of the groove has to be modified according to the change expected in the thread to be cut due to hardening.

Another method is described in the " machinist Encyclopedia " in which, by using a taper attachment and setting the tap blank at the same angle, properly figured, as the slide of the taper attachment, by adjusting the tailstock-center, the lead may be slightly alterated.

This method is objectionable because it is extremely difficult to set the axis of the object exactly parallel to the slide of the taper attachment, and also, because, unless the cutting tool is adjusted at the corresponding angle, the thread triangle is not isosceles, but dissymetrical and therefore the threading not accurate.

Moreover, the operation being made with a lathe inherits every imperfection due to all machines based on the same principle, i. e., the irregular movement of the insufficiently guided carriage; unaccurate cutting of the gears, and defective centering of the tailstock-center.

The present machine constitutes a thread cutting or grinding machine which makes it possible to work more accurately than under the above mentioned methods. The proposed device consists of a bench, carrying the cutting tool, or grinding wheel and, a carriage which slides along the bench, and carries the head- and tail-frame holding the object to be threaded. The lead-screw prolongs the head shaft or centre and is fastened to it. The block, holding its nut, is also movable on the bench; the space between the head- and tailstock-frame and the lead-screw nut is variable and corresponds with the number of revolutions of the lead-screw; besides, were the lead-screw nut fixed, the displacement of the frame on the bench would be proportional to the pitch of the lead-screw. The invention also is to connect this lead-screw nut-block and the head- and tailstock-frame by means of a straight lever, the pivot of which is fastened to the bench. The changing of this point of attachment results, for the frame, into variable displacements along the bench. It is therefore possible to cut a thread of any given pitch, without changing the lead-screw. The cutting tool, or grinding wheel, is held in a tool holder, or grinder, fastened to the backboard, which is a part of the bench. Special attachments allow the placing of the centers of the head and tailstock on a true parallel to the sliding plane of the bench, and to set the tailstock exactly back to the same position, when the part being worked upon is set back in place. Moreover, for the accurate cutting out or grinding work, which is generally executed by successive approximations and requires frequent micrometer measurements, such measurements can be made in actual working position on the machine, by a special carriage with a micrometric dial.

In order to emphasize the foregoing statement, I hereafter describe one of the machines in which my invention materializes, the annexed drawings being:

Fig. 1, the general front view of the apparatus, with its back-board, which slopes down, shown in a vertical position.

Fig. 2, the plan of the extreme left end of the apparatus, showing the connection of the head- and tailstock-frame to the lead-screw nut-block.

Fig. 3, the end-view showing the tailstock held in place.

Fig. 4, a cross view of the apparatus showing the actual slope of the bench, with the micrometric carriage in position, ready for measurements.

Fig. 5, the front-view of the micrometric carriage.

The apparatus is made of (Fig. 4) a sloping bench, the upper face (2) of which forms a true plane table. The bench (1) is fastened to a back-board (3) which is perpendicular to it and also faced to a true plane. On the table (2) slips (Fig. 1) along the same dovetailed groove (4):

1st. A frame (5) carrying a head (6) and a tailstock (7).

2nd. A block (8) holding the lead-screw.

The center point (9) is carried by a shaft (10) with abutment bearings not shown on the drawing, and cased in the head stock (6); it prolongs into the lead-screw (11), fastened to it and engaged in the nut (12) in the lead-screw nut-block (3). The tailstock-center (13) is carried on a stem (14) shaped to a true cylinder, and resting in a V notch (15), cut out in the tailstock (7) in which it is held by links (16), that are held by bolts (17). The frame (5) carrying the head and tail stocks, has (Fig. 2) an arm (18) which carries a stem (19) parallel to the axis of the frame and terminated by a friction roller (20). The lead-screw nut-block (8) also carries a friction roller (21). A lever (22) having its pivot at point 23, on a carriage 23ª which is actuated by a hand operated screw 23ᵇ and slides on the bench of the apparatus at a right angle with the axis of the frame (5), said lever composed of two arms (24 and 25) forming two parallel rolling tracks, lying on either side of the pivot (23) at a distance from this pivot equal to the radius of the friction rollers (20 and 21), so that when the lever bears upon these two rollers, the three centers (20, 23, 21) are in a straight line. Springs 24ª and 25ª properly located, force the two arms of the lever (22) to rest permanently against the rollers (20, 21). The head- and tailstock-frame (5), is not fastened to the bench, but is carried by a bed (26) to which it is fastened by means of gudgeons (27) held in V shaped notches of the bed. At the other end, the frame is connected to the bed (26) by means of a set screw (28).

The piece being cut (29), with its handle (30), is held between the lead center (9) and the tailstock-center (13); the cutting tool (31), or the grinding wheel, is held by a tool-holder (32) fastened to the back-board (3); a micrometric carriage, composed of a bed (33) (Fig. 4) slides along the back-board and has two heads (34 and 35), one of which carries a fixed spindle (36) and the other a movable one (37) formed by the end of a stem (38) sliding loose in a V shaped notch cut out in the head (35). This micrometric carriage hangs from a cable (39), with a counterweight (40), which cable goes around the pulley (41) of a small slide (42) sliding on the upper edge (43) of the back-board (3) which has been machined to a true plane.

The working of this accurate thread-cutting or grinding machine is as follows:

When the lead-screw (11) rotates, the head- and tailstock frame (5) and the lead-screw nut-block (8) either move from or toward each other, the relative displacement being in proportion with the revolution of the lead-screw. Were the block (8) fixed, the frame (5) would slip along the bench and therefore in front of the tool (31), proportionally, and the screw being cut (29) would be threaded with a lead equal to that of the lead-screw (11). But, as above stated, the frame (5) and screw nut block (8) are free in their movement in the dovetail groove (4) of the bench (1); they are only connected to this bench by means of the straight lever (22), the pivot (23) of which is located at a variable point on the bench. It can easily be demonstrated that when the relation between the distances (20—23) and (21—23) is caused to vary by a transverse displacement of the carriage 23ª which carries the pivot (23), it is possible to make the displacement of the frame (5) on the bench (1), take any given value per revolution of the shaft and lead-screw, the relation to the pitch of the lead-screw (11) being easily determined.

Therefore, it is possible to regulate the motion of the screw being cut (29) in front of the tool (31) to any given length for any given angular displacement of its own, and to cut a thread with any desired lead without changing the lead-screw.

The working principle of this machine being thus explained, the following statements show how care has been taken to insure its perfect accuracy:

The connection of the head- and tailstock-frame (5) with its bed (26) around the gudgeons (27), the holders of which are built to have their axis exactly perpendicular to the line drawn from the head-center to the tailstock-center permits to bring the axis of the head and tailstock exactly parallel to the table (2) and to the dovetailed groove (4). The tailstock-center stem being shaped to a true cylinder, as above stated, is held in a V shaped notch (15) on the tailstock (7); the notch is made of two surfaces leveled to a true plane, and its edge is parallel to the axis of the head shaft (10), the position of its axis as regards to the frame (5) is thus exactly determined and is always the same every time this tailstock center is replaced in the V holder.

Such conditions do not exist with ordinary lathes, where the tailstock is carried by a cylinder held in a cylindrical holder with an unavoidable play. The correcting of a thread cut being made by successive approximations, the operator must, with the machines now in use, remove the screw being cut (29) from the lathe in order to make measurements with a micrometer and see how the work is progressing. With the apparatus here described, the micrometric carriage (23) allows the measuring of the screw (29) while on the bench; the tool holder (32) remaining in its fixed position on the back-board (3) the frame (5) is slipped back to the left in order to clear the piece (29) away from the cutter (31). The upper part of the tailstock (13) is cut off as shown in Fig. 1, to allow this movement past the tool even when the tool (31) is working very close to the axis, such as for screws (29) of a very small diameter. The micrometric carriage (33) is lifted up so that its fixed spindle (36) (Fig. 5) comes up to the thread on the piece (29); the movable spindle is then laid down on its frame's V groove, so that the removable center (37) also rests against the thread at the other end of the diameter, just opposite the center (36). The heights of the axis of the spindles (36 and 37) above the back-board are built to be equal to the height of the axis of the apparatus above same.

The movable spindle (38), (Fig. 4) is supplied with a finger (44) which comes to rest upon the mobile piston of a graduated dial (45), which shows at sight the variation of the pitch diameter of the thread. When the measurement has been made, the micrometric carriage (33) is turned down and the piece (29) is brought back in front of the cutter (31), or grinding wheel.

The main part of the above described thread cutting and grinding machine, can be supplied to a large number of motor acted constant speed machines, in which a movable part is desired, having a uniform motion along a straight line with variable velocity under quick and easy control.

Such is the case, for instance, with usual thread cutting and milling lathes, where different leads are obtained by changing the ratio from the angular speed of the shaft to the lineal velocity of the carriage.

Such changing is generally obtained by changing the driving gears, a long and uneasy operation that requires, moreover, several sets of gears and might be obtained by a mechanism similar to the above described one, namely a lever connecting the lead-screw to a carriage and having a mobile pivot, the displacement of which controls the lead of the thread being cut.

I claim:

1. An accurate thread cutting and grinding machine, comprising a bench, a slide thereon, a headstock and a tailstock mounted on said slide and movable in unison, a lead screw, a slide supporting the latter, a double armed lever between the two slides, and a pivot for the said lever movable transversely to the slides.

2. An accurate thread cutting and grinding machine, comprising a bench, a slide thereon, a headstock and a tailstock mounted on said slide and movable in unison therewith, a block slidable in a line with said slide, a centre mounted in the headstock, a lead screw rigidly connected to said centre and mounted in said block, a double armed lever between the slide and the block, a pivot for the said lever, and means to move the pivot on the slide.

3. In an accurate thread cutting and grinding machine, a slide, a bed thereon, gudgeons holding said bed at one end to the slide, a screw at the other end of said bed to incline the bed to said slide, and a tail stock and a head stock rigid on said bed.

In testimony whereof I have hereunto subscribed my name.

JEAN AMEDEE HARDEL.